United States Patent [19]
Toy et al.

[11] Patent Number: 5,550,864
[45] Date of Patent: Aug. 27, 1996

[54] BIT RATE-INSENSITIVE MECHANISM FOR TRANSMITTING INTEGRATED CLOCK AND DATA SIGNALS OVER DIGITAL COMMUNICATION LINK

[75] Inventors: James W. Toy, Melbourne; Paul W. Casper, West Melbourne, both of Fla.

[73] Assignee: Broadband Communications Products, Melbourne, Fla.

[21] Appl. No.: 160,054

[22] Filed: Dec. 1, 1993

[51] Int. Cl.$^6$ .................................................... H04L 25/49
[52] U.S. Cl. ............................ 375/293; 375/359; 341/70
[58] Field of Search ................................ 375/20, 49, 110, 375/23, 25; 341/52, 58, 64, 70; 371/57.1; 360/44

[56] References Cited

U.S. PATENT DOCUMENTS

| | | | |
|---|---|---|---|
| 4,001,578 | 1/1977 | Cook et al. | 341/69 |
| 4,267,595 | 5/1981 | Hernandez | 375/110 |
| 4,888,791 | 12/1989 | Barndt, Sr. | 375/110 |
| 4,954,825 | 9/1990 | Chi | 375/110 |
| 5,319,771 | 6/1994 | Takeda | 395/550 |

Primary Examiner—Stephen Chin
Assistant Examiner—Don Vo
Attorney, Agent, or Firm—Charles Wands

[57] ABSTRACT

A totally D.C. balanced and bit-rate independent digital clock encoding technique is applicable to a variety of digital signalling systems, including fiber optic digital signalling. Each of successive event cells of the clock signal is demarcated by clock transitions of opposite polarity, so that each clock cycle contains two event cells, one of which is redundant. For a first binary data value, such as a '0', a pair of unmodified successive event cells of the clock signal are provided as an output. Namely, the clock signal is unaffected, so that both halves of a complete, unmodified clock cycle are reproduced 'as is' as the encoded clock output. For a second binary data value, such as a '1', an event cell is modified by inserting a pulse, of finite duration, less than the duration of the event cell, the pulse being delayed with respect to a leading clock transition of the pair of alternating, opposite clock transitions of the event cell. Since event cells are encoded in pairs, in order to provide redundancy and achieve total D.C. balance, the first pulse has a first polarity, while the second pulse has a second, complementary polarity. Because the encoding mechanism of the present invention has built-in redundancy, it readily accommodates both quality monitoring at the receiver, as well as sub-rate channel signalling.

35 Claims, 8 Drawing Sheets

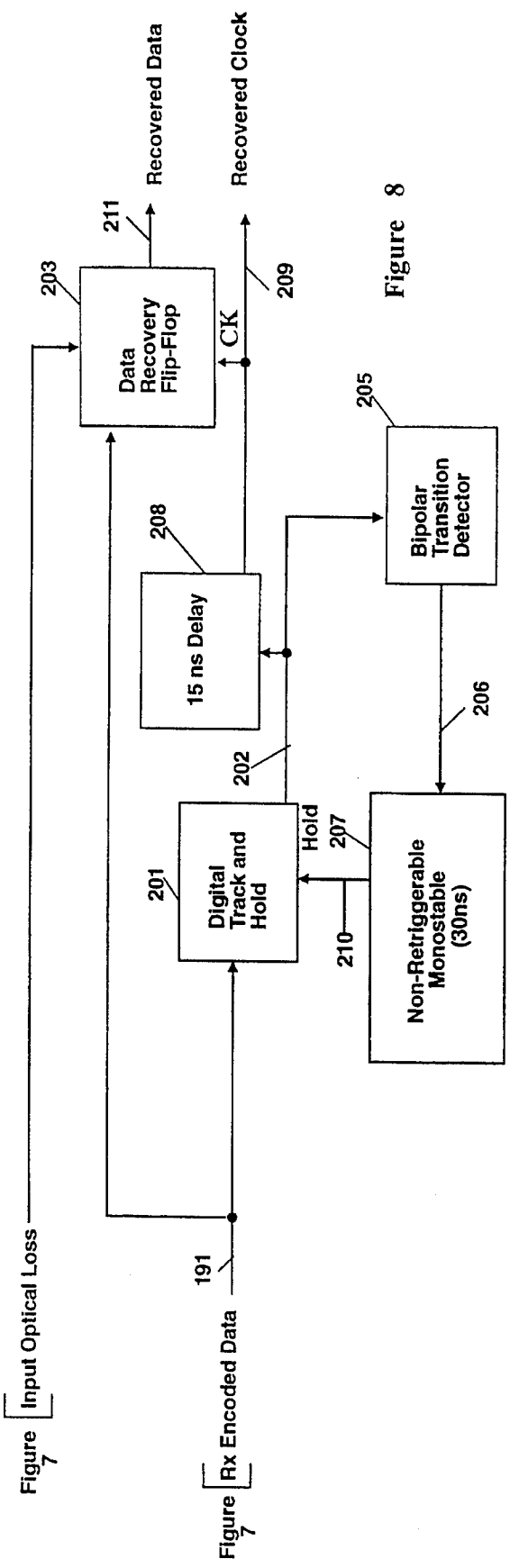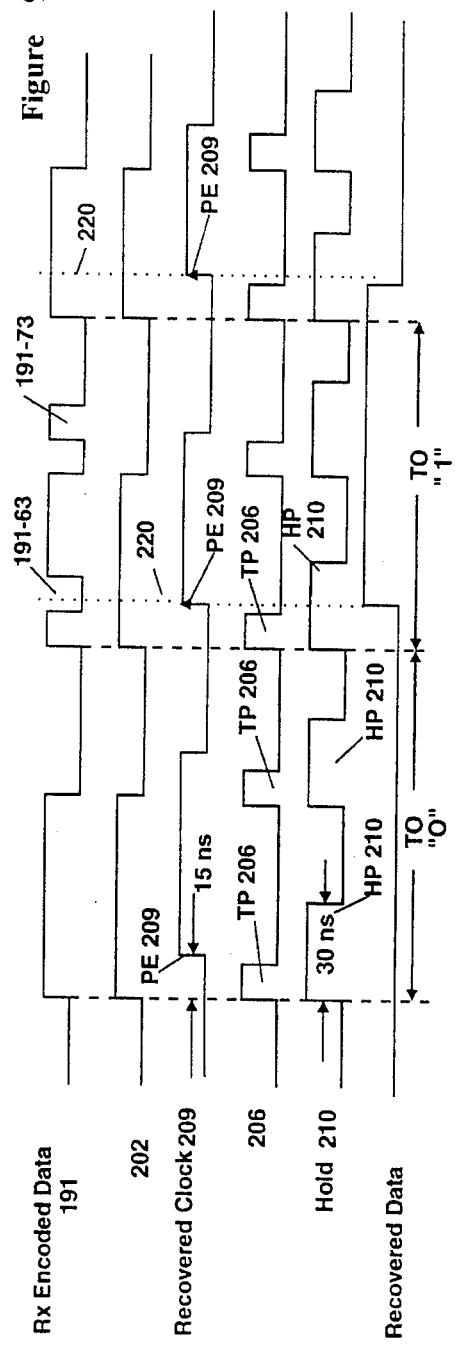

BIT RATE-INSENSITIVE MECHANISM FOR TRANSMITTING INTEGRATED CLOCK AND DATA SIGNALS OVER DIGITAL COMMUNICATION LINK

FIELD OF THE INVENTION

The present invention relates in general to communication systems, and is particularly directed to a scheme for digitally modifying a clock signal in accordance with binary data, so as to obtain an encoded clock signal that is employed to modulate a digital transmitter output signal, such as light beam used for fiber optic communications.

BACKGROUND OF THE INVENTION

Fundamental to the successful operation of a digital communication system, such as the digital fiber optic communication system diagrammatically illustrated in FIG. 1, is its ability to recover clock and perform error detection at the receiver site. In order to optimize efficiency and reduce cost, it is common practice to combine an incoming digital data stream 11 and a clock signal 13 into a composite signal. The composite signal is produced by a transmit/encoder 15 and is transmitted either 'as is', or further encoded (e.g. scrambled/encrypted). The encoded signal is used to digitally modulate a carrier, such as laser output beam which is conveyed over a fiber optic channel 17 to a downstream receiver site 21. At the receiver site 21, the digitally modulated light beam is processed to extract, or recover, each of the embedded clock signal and data.

In order to maintain accurate operation and maximum sensitivity of the signal receiving circuitry, it is necessary that the transmitted digital data stream be as D.C.-balanced as possible. In addition, communication system users customarily require that the recovered clock exhibit minimum clock asymmetry. Because of these requirements, integrated clock and data encoding schemes have customarily involved the use of complex signal processing algorithms, which are often data rate specific, entailing costly circuit designs.

One prior art digital encoding technique for accommodating a variation in the rate of the clock signal onto which data is to be digitally encoded is described in the Chi U.S. Pat. No. 4,954,825, entitled "Self Clocking Binary Data Encoding/Decoding Method," issued Sep. 4, 1990, and companion U.S. Pat. Nos. 4,951,049 and 5,025,328. Although not characterized as being employed in digital data transmission systems, but rather being directed to solving the problem of variations in speed of movement of a digital recording medium past a read/write transducer (such as a magnetic recording/reproduction head), the digital encoding technique of Chi accommodates variations in clock rate by the use of a derivative encoding-extraction technique. This derivative technique is clock edge polarization sensitive, whereby the full cycle boundaries of each clock signal will be read out with a well demarcated polarization and amplitude, on the one hand, whereas encoded data modulation between the full cycle clock edges will either have an opposite polarity (for a first binary value, e.g. '1') or have a very reduced amplitude (for a second binary value, e.g. '0'). Also, the location of the data modulation is sufficiently displaced relative to the full cycle clock boundaries, so that clock and data are separately identifiable.

More particularly, with reference to FIG. 2, which corresponds to FIG. 1 of the above-referenced '825 Chi patent, in order to produce an encoded clock signal with a data bit of a first binary value, '1' for example, a single high-to-low transition occurs between the low-to-high clock cycle boundary transitions. On the other hand, to encode a data bit of a second, complementary binary value, '0' for example, the interior portion of the event cell undergoes a plurality of (high-to-low/low-to-high) transitions between the low-to-high clock transitions that bound the opposite ends of the event cell.

Because of the nature of the operation of the sensing transducer (such as a magnetic head) in the recording/playback circuitry, the plurality of closely spaced high-to-low/low-to-high transitions between the positive polarity transitions in the clock signal effectively destructively combine to produce a minimum amplitude output signal, associated with a binary value of '0', as shown by the read waveform. On the other hand, for the complementary data value of '1', since its associated single transition within an event cell has no immediately adjacent opposite polarity transition to reduce its amplitude when differentially sensed, a well demarcated negative polarity output pulse is produced. Similarly, since the end boundary of each clock cycle or event cell is also defined by only a single (positive polarity, or low-to-high) transition, and has no immediately adjacent opposite polarity transition to reduce its amplitude when differentially sensed, a well demarcated positive polarity pulse is produced. Thus, on read-out, positive polarity pulses are detected as clock cycle boundaries, negative polarity pulses are detected as '1' bits, and very reduced amplitude values between clock cycle boundaries are detected as '0' bits.

As noted above, even though the binary clock encoding scheme described in the Chi patent embeds data in the clock signal and allows for variations in clock rate, it is designed for use in a signal recording/playback device having derivative-based signal recovery, and is not readily suitable for digital data communications. Shortcomings of the patented encoding mechanism to digital communications include the fact that each event cell of the data-embedded clock stream occupies a complete clock cycle. This, coupled with its use of a derivative-based encoding mechanism, results in a D.C. level that is prone to depart significantly from zero, and also prevents quality (bit error rate) monitoring and sub-rate channel signalling.

SUMMARY OF THE INVENTION

In accordance with the present invention, the above described drawbacks of conventional digital clock encoding schemes, including that proposed by Chi and others, are effectively obviated by a digital clock encoding technique that is totally D.C. balanced and also bit-rate independent, so that it is not bandwidth limited, but is applicable to a variety of digital signalling systems, including, but not limited to, fiber optic digital signalling. Moreover, the encoding mechanism of the present invention has built-in redundancy, which allows for both quality monitoring at the receiver, as well as sub-rate channel signalling.

Pursuant to the present invention, rather than equate a respective event cell with a complete clock cycle, whereby an event cell is demarcated by clock transitions of the same polarity at the ends of the clock cycle, as in the above-referenced Chi encoding mechanism, each event cell is demarcated by clock transitions of opposite polarity, whereby a respective event cell is defined as the epoch bounded by alternating, opposite clock transitions of the clock signal. Namely, according to the invention, within each clock cycle there are two event cells, rather than one, as in the prior art. This additional, or redundant, event cell provides the invention with a significant performance capability not heretofore obtained.

More particularly, the binary encoding scheme through which the clock signal is selectively modified in accordance with the redundant event cell generation technique of the invention is such that, for a first binary data value, such as a '0', a pair of unmodified successive event cells of the clock signal are provided as an output. Namely, the clock signal is unaffected, so that both halves of a complete, unmodified clock cycle are reproduced 'as is' as the encoded clock output. On the other hand, for a second binary data value, such as a '1', a pair of modified versions of successive event cells of the clock signal are provided as the encoded clock output.

For the second binary value, the modification of an event cell involves inserting a pulse, comprised of a pair of successive opposite polarity transitions between the respective pair of alternating, opposite clock transitions that demarcate the end boundaries of the event cell. This is preferably accomplished by inserting a pulse of a finite duration, less than the duration of the event cell, the pulse being delayed with respect to a leading clock transition of the pair of alternating, opposite clock transitions of the event cell. Since event cells are encoded in pairs, in order to provide redundancy and achieve total D.C. balance, the first pulse has a first polarity, while the second pulse has a second, complementary polarity.

Stated another way, the clock encoding mechanism in accordance with the present invention may be defined in accordance with the following rule set.

| Data State | Rule |
| --- | --- |
| Data = 0 | Transmit clock cycle (event cell) directly |
| Data = 1 | Continue to transmit the clock cycle (event cell), but insert opposite polarity 10 nsec pulses exactly 10 nsec after each clock transition. |

Since the presence of the pulses corresponds to a data value of '1' and their absence indicates data value of '0', data recovery at the receive end of the link requires only the reliable detection of the presence/absence of pulses, and clock recovery only involves blanking the inserted 10 nsec pulses for data=1.

In a preferred embodiment of the present invention asymmetry in an original transmit clock, which may be not be insubstantial (e.g. 60/40 or 40/60), is first applied to a clock asymmetry corrector, which adjusts the input clock so as to produce an 'asymmetry-corrected' encoder clock having a very small degree of asymmetry (e.g. less than±5%). This encoder clock is applied to the clock input of a flip-flop, which has its data input coupled to receive binary data to be encoded onto the corrected clock. The output of the flip-flop is coupled to a first input of an OR gate, which has its output coupled to a first input of an exclusive NOR gate. The output of the exclusive NOR gate corresponds to the desired encoded clock signal. This encoded clock may be applied to an optical transmitter unit for electro-optic conversion and fiber-coupling to a digital communication link. The corrected or encoder clock is further coupled to a bipolar transition detector, the output of which is coupled through a delay circuit to a second input of the OR gate. The bipolar transition detector generates a relatively narrow pulse in response to each transition of the encoder clock signal.

In operation, if the binary value of the data input signal applied to the data input of the flip-flop is a zero, the output of the flip-flop and, consequently, the output of the OR gate will be high, so that the encoder clock passes through the exclusive NOR gate, 'as is', and is applied to its output unchanged, thereby effectively implementing the above coding rule for a data state=0. On the other hand, if the binary value of the data input signal is a 'one', then when the transmit data line changes state and goes from low to high, the output of the flip-flop goes low at the next encoder clock transition, which enables a delayed pulse from the delay circuit to pass through the OR gate and applied to the exclusive NOR gate. The application of the delayed pulse output of the OR gate to the exclusive NOR gate causes its output state to reverse for the duration of the pulse, thereby effectively inserting a narrow pulse after each of the clock transitions of the encoder clock, and thereby implementing the above-described coding rule for data=1.

Should there be a loss of input clock signal, an input clock loss line changes state, forcing the clock asymmetry corrector to a predetermined 'loss' clock frequency. This also forces the data state to zero, by holding the flip-flop in a hard reset state. As a result, in the event of loss of the transmit clock, with the output of the flip-flop being held high, and a predetermined 'loss' clock frequency being applied as a 'substitute' encoder clock, a constant zero data state is provided at the output of the exclusive NOR gate and transmitted to the far end of the communication link, which prevents the receive end data output line from chattering.

In an exemplary application of the invention to a fiber optic communication system, the encoded clock output by the exclusive NOR gate is used to modulate the output beam produced by a laser diode module. The laser diode is coupled to launch its digitally modulated output into an optical fiber. At the receive end of the fiber, an optical receiver converts incident light that has been transmitted over the fiber into electrical output signals for clock and data recovery. The optical receiver may comprise a PIN photodiode, the current signal output of which is coupled directly to a transimpedance preamplifier. The trans-impedance preamplifier has complementary transimpedance outputs coupled directly to balanced inputs of an emitter-coupled logic (ECL) limiting amplifier, the output of which provides an encoded data signal, from which both clock and data bits are recovered.

The received encoded data from the optical receiver is routed to a digital track and hold circuit and to the data input of a data recovery flip-flop. The digital track and hold circuit is operative to recover the clock signal, in combination with a very fast bipolar transition detector and a non-retriggerable monostable circuit. The output of the digital track and hold circuit is coupled to a delay circuit, the output of which provides the recovered clock signal for application to the clock input of the data recovery flip-flop. The output of the flip-flop provides recovered data for the user.

In operation, the output of the digital track and hold circuit "tracks" the received signal, so long as a "hold" command signal from the monostable circuit is not asserted. If such a "hold" command is asserted just prior to the occurrence of inserted data=1 pulses, and held until just after the pulses disappear, these inserted pulses will be effectively stripped off, and the output signal will be an exact reproduction of the original clock signal.

The "hold" command input to digital track and hold circuit is generated by the operation of the bipolar transition detector and non-retriggerable monostable circuit. The bipolar transition detector outputs a trigger pulse every time the output of the digital track and hold circuit transitions either high or low. These pulses, in turn, trigger the non-retriggerable monostable circuit, which outputs a "hold" pulse. This "hold" pulse freezes the state of digital track and hold circuit. The duration of the "hold" pulse is such that the "hold" pulse "straddles" the insertion pulses in the received encoded data bit stream, so that the pulses are effectively blanked and therefore do not appear in the signal at the output of the digital track and hold circuit, which represents a non-delayed version of the recovered clock. The output of the delay circuit is the recovered clock signal.

The timing is such that a positive edge of the recovered clock signal occurs exactly in the middle of the first data=1 insertion pulse in the received encoded data bit stream. The flip-flop is used to sample the received encoded data, whereby the presence or absence of the insertion pulse may be detected, thereby providing an indication of the state of the data bit. It is necessary to only sample one of the two insertion pulses for each data=1 bit. The redundant second insertion pulse keeps the encoded data exactly dc-balanced; in addition, the redundant pulse creates the possibility for sub-rate channel signalling and in-service error detection. Should there be a loss of input optical signal, an input optical loss status alarm signal is applied to a hard reset input of the flip-flop, so as to force the output data to a steady-state zero, thereby avoiding the output of "trash" data.

In-service error detection is easily accomplished by sampling the presence of the second insertion pulse and comparing the detected data value with the first pulse sample. If the two data values are different, an error is inferred. Sub-rate channel signalling may be effected by intentionally interrupting the transmission of the second insertion pulse in a predetermined, systematic manner, similar to the transmission of legal bipolar violations used for sub-rate channel signalling in alternate-mark-inversion bipolar signalling formats over conventional copper wire pairs. This systematic "error pattern" can be sensed at the output of the receiver decoder and a prescribed action, such as "execute switched loopback", performed in response to detection of the given error pattern.

As pointed out above, to accommodate asymmetry in an original transmit clock, the transmit clock is first applied to a clock asymmetry corrector, which adjusts the input clock so as to produce an 'asymmetry-corrected' encoder clock having a very small degree of asymmetry. The clock asymmetry corrector ensures maximum far-end receiver sensitivity (there is no baseline wander due to asymmetry in the incoming serial data stream) and also provides a very high quality clock signal. The clock asymmetry corrector contains a phase-frequency detector to which the original transmit clock is applied. The phase-frequency detector has an output coupled to a loop filter. The output of the loop filter is coupled to a voltage-controlled oscillator (VCO), the output of which is a clock signal having a 50/50 output duty cycle which enables its use directly as the regenerated clock. The oscillator tunes in excess of an octave, from below 5 to above 10 MHz and provides its output to a programmable divide-by-N (modulo two) divider. The programmable divide-by-N divider provides a plurality of simultaneously available 50/50 duty cycle modulo-2 clock frequencies, divided down from the VCO. The selected output clock is determined by a divide-by-N controller. The value of N is programmable. The divide-by-N controller generates commands which determine the selected frequency. A strobe frequency is controllably inhibited by a lock detector which monitors the output of the phase-frequency detector. In operation, a transmit clock is applied to phase-frequency detector. Initially, with the loop out of lock no inhibit signal is asserted by the lock detector, so that a controller strobe output signal is not inhibited. Given an arbitrary beginning state for the divide-by-N controller, an arbitrary divided-down clock frequency is selected. Further, assuming that this frequency is not within the loop pull-in range, a lock detect state change will not occur prior to the occurrence of the next pulse output by the controller strobe circuit. At the next strobe, the next lower encoder clock frequency tap will be selected by the programmable divide-by-N divider, and again lock will be attempted. If the newly selected clock is within pull-in range, a lock detect will occur prior to the occurrence of the next controller strobe; thereafter the strobe pulses will be inhibited. If the loop is not in range, this sequencing process will continue until the correct frequency is located and locked, whereupon the controller strobe will be inhibited by the lock detector, as long as the input transmit clock signal is not interrupted, or the frequency is not changed.

Should the input clock signal be removed, an input clock loss status alarm signal will be asserted. This 'loss of clock' signal will force the clock asymmetry corrector to output the above-mentioned predetermined 'substitute' clock frequency, so that an acceptable quality clock is still available for transmitting a steady-state (data=0) signal (i.e. an unmodified clock signal) to the far end receiver.

BRIEF DESCRIPTION OF THE DRAWINGS

FIG. 8 is a block diagram of a receive decoder block diagram;

FIG. 9 is a timing diagram associated with the operation of FIG. 8;

DETAILED DESCRIPTION

Figure 1:
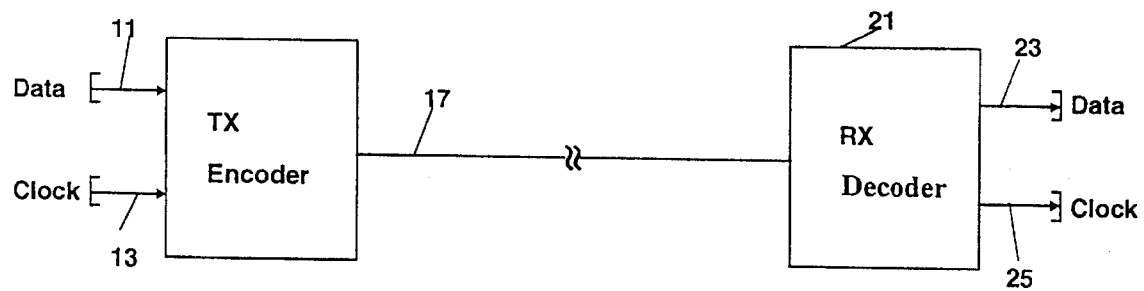
FIG. 1 is a simplified diagrammatic illustration of a digital fiber optic communication network.
Figure 2:
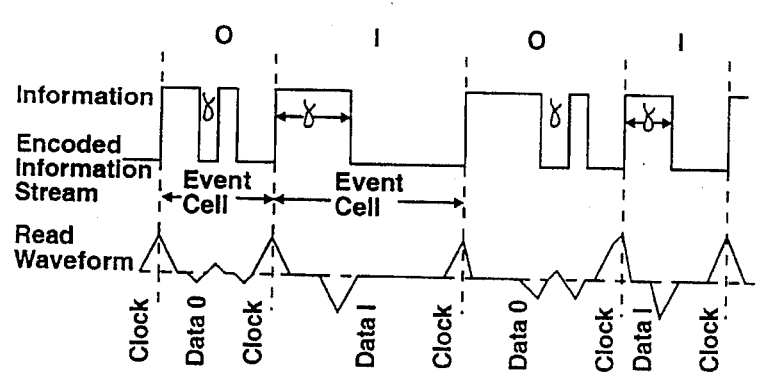
FIG. 2 is a signalling diagram corresponding to FIG. 1 of the Chi U.S. Pat. No. 4,954,825.

Before describing in detail the particular improved bit-rate independent clock encoding technique in accordance with the present invention, it should be observed that the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

CLOCK ENCODING (FIG. 3)

Figure 3:
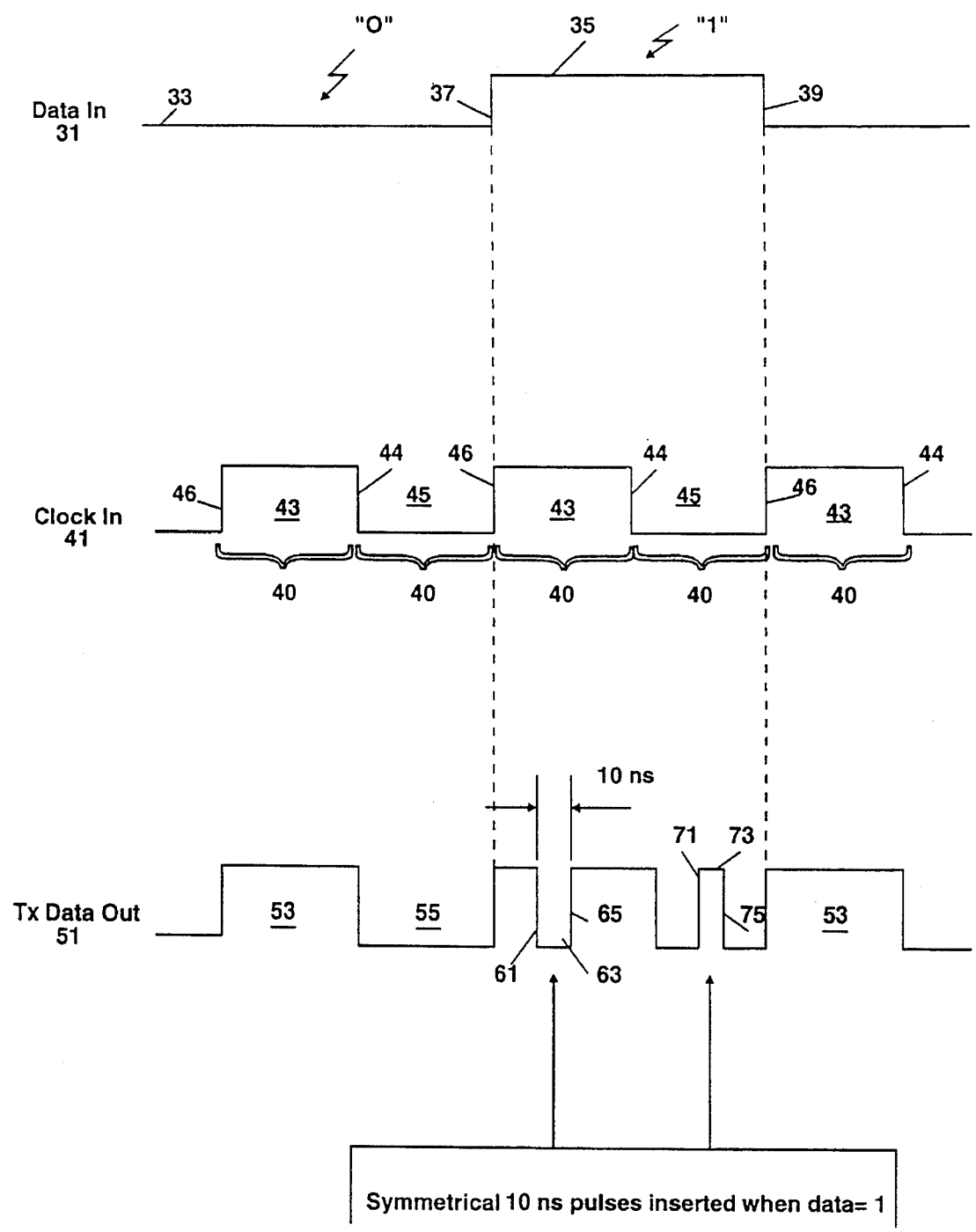
FIG. 3 is a timing diagram illustrating the manner in which the encoding mechanism of the present invention encodes a binary input data signal into an input clock signal.

FIG. 3 is a timing diagram illustrating the manner in which the encoding mechanism of the present invention encodes a binary input data signal 31 into an input clock signal 41, so as to provide an encoded data output signal 51 comprised of a single, serial stream of pulses for transmission over a single channel communication link, such as an optical fiber. At the far end, or downstream end of the link, the serial stream is decoded and both the clock and data signals are recovered without any constraints on the data pattern or clock frequency. For purposes of providing a non-limitative example, the clock frequency may be on the order of from 1 KHz to 10 MHz.

The binary data signal 31 is shown as comprising a first binary signal level portion 33, representative of a first binary value, e.g. '0', and a second binary signal level portion 35, representative of a second binary value, e.g. '1'. The clock signal 41 is shown as comprising a first 'high' clock level portion 43, and a second 'low' clock level portion 45. The transition between 'high' clock level portion 43 and 'low' '0' clock level portion 45 is a high-to-low edge 44; the transition between 'low' clock level portion 45 and 'high' clock level portion 43 is a low-to-high edge 46. Although, for the exemplary clock signal illustrated in FIG. 3, the duty cycle of the high level portion is shown as being on the order of 50%, there is no requirement that each of the high and low portions of a respective cycle of the clock signal have the same duration.

Pursuant to the present invention, each portion of the clock signal 41 lying between a respective pair of successive clock transitions, whether they be high-to-low transitions 44, or low-to-high transitions 46, is defined as an event cell 40. Namely, a respective event cell corresponds to a clock epoch bounded by alternating, opposite clock transitions of the clock signal. Thus, a complete clock cycle, comprised of a respective high clock level portion 43 and a respective low clock level portion 45, contains two successive event cells, rather than one, as in the prior art. As will be described, this additional, or redundant, event cell per clock cycle provides the invention with a significant performance capability not heretofore obtained.

The effect of the binary encoding scheme through which clock signal 41 is selectively modified by the redundant event cell generation technique of the invention is shown by encoded data stream 51, wherein, for a first binary data value, such as a '0' bit, corresponding to binary signal level portion 33 of the data signal 31, the pair of unmodified successive event cells 43 and 45 of the clock signal are replicated as high signal level portion 53 and low signal level portion 55, which coincide with clock signal portions 43 and 53. Namely, for a first binary data value (here '0'), the clock signal is unaffected, so that both portions 43 and 45 of a complete clock cycle are reproduced 'as is' (at 53 and 55) in the encoded clock output signal 51.

On the other hand, for a second binary data value, here a '1', each of the pair of successive event cells 43 and 45 of the clock signal 41 is modified by the insertion of a respective pulse, shown at 63 and 73. For an event cell having a high clock level, here event cell 43, the inserted pulse 63 is comprised of a first high-to-low transition 61, delayed with respect to the leading edge 46 of the event cell, followed by an opposite, low-to-high transitions 65, delayed by a prescribed pulse width duration from the transition 61. For purposes of the present example of employing a clock rate range of from 1 KHz to 10 MHz, both the delay and duration of pulse 63 may be on the order of 10 ns. Conversely, for an event cell 45 having a low clock level, the inserted pulse 73 is comprised of a first low-to-high transition 71, delayed with respect to the leading edge 44 of the event cell, followed by an opposite, high-to-low transition 75, delayed by a prescribed pulse width duration from the transition 71. As in the case of pulse 63, both the delay and duration of pulse 73 may be on the order of 10 ns. Since event cells are encoded in pairs of first polarity pulse 63 and second polarity pulse 73, they provide both redundancy and achieve total D.C. balance.

The encoding mechanism described above and shown in FIG. 3 may be defined in accordance with the following rule set.

| Data State | Rule |
| --- | --- |
| Data = 0 | Transmit clock cycle (event cell) directly |
| Data = 1 | Continue to transmit the clock cycle (event cell), but insert opposite polarity 10 nsec pulses exactly 10 nsec after each clock transition. |

Since the presence of the pulses 63 and 73 corresponds to a data value of '1' and their absence indicates data value of '0', data recovery at the receive end of the link requires only the reliable detection of the presence/absence of pulse 63 or 73, and clock recovery only involves blanking the inserted 10 nsec pulses for data=1.

TRANSMIT CLOCK ENCODER (FIGS. 4 AND 5)

Figure 4:
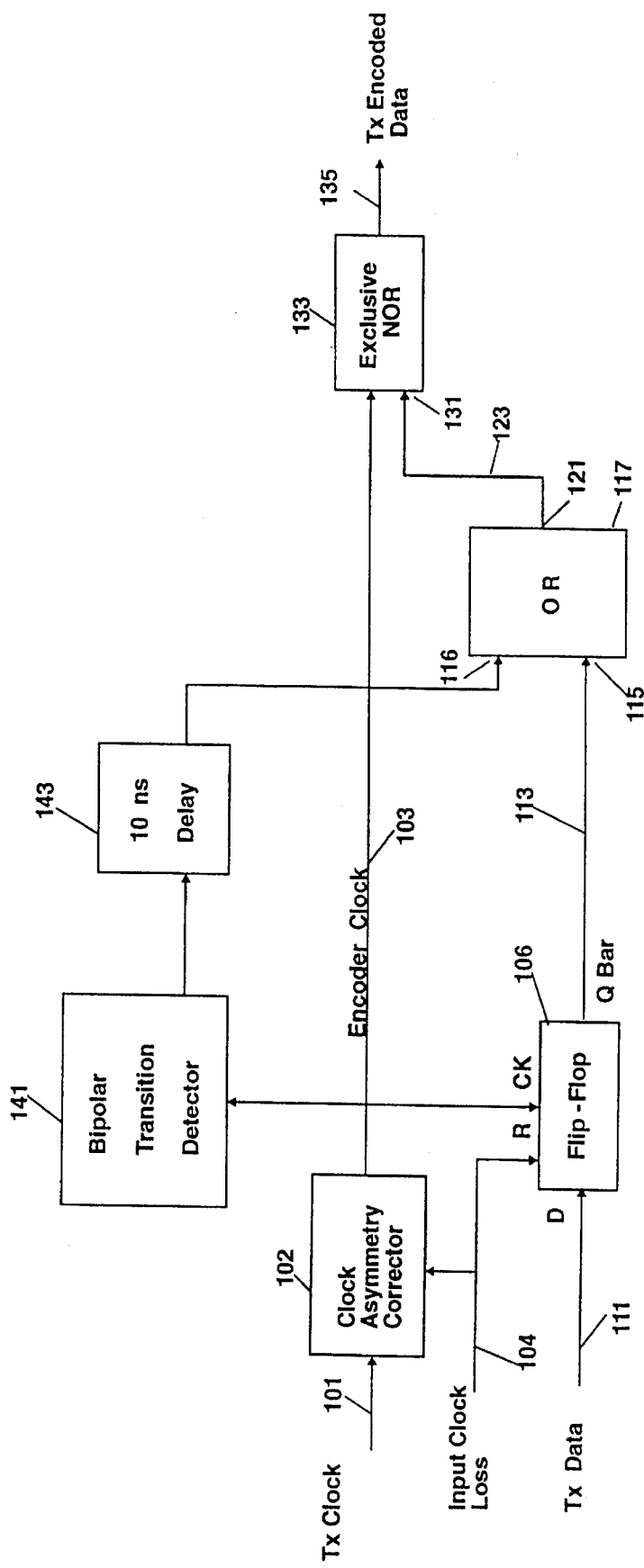
FIG. 4 is a block diagram of an embodiment of a transmit encoder in accordance with the present invention.
Figure 5:
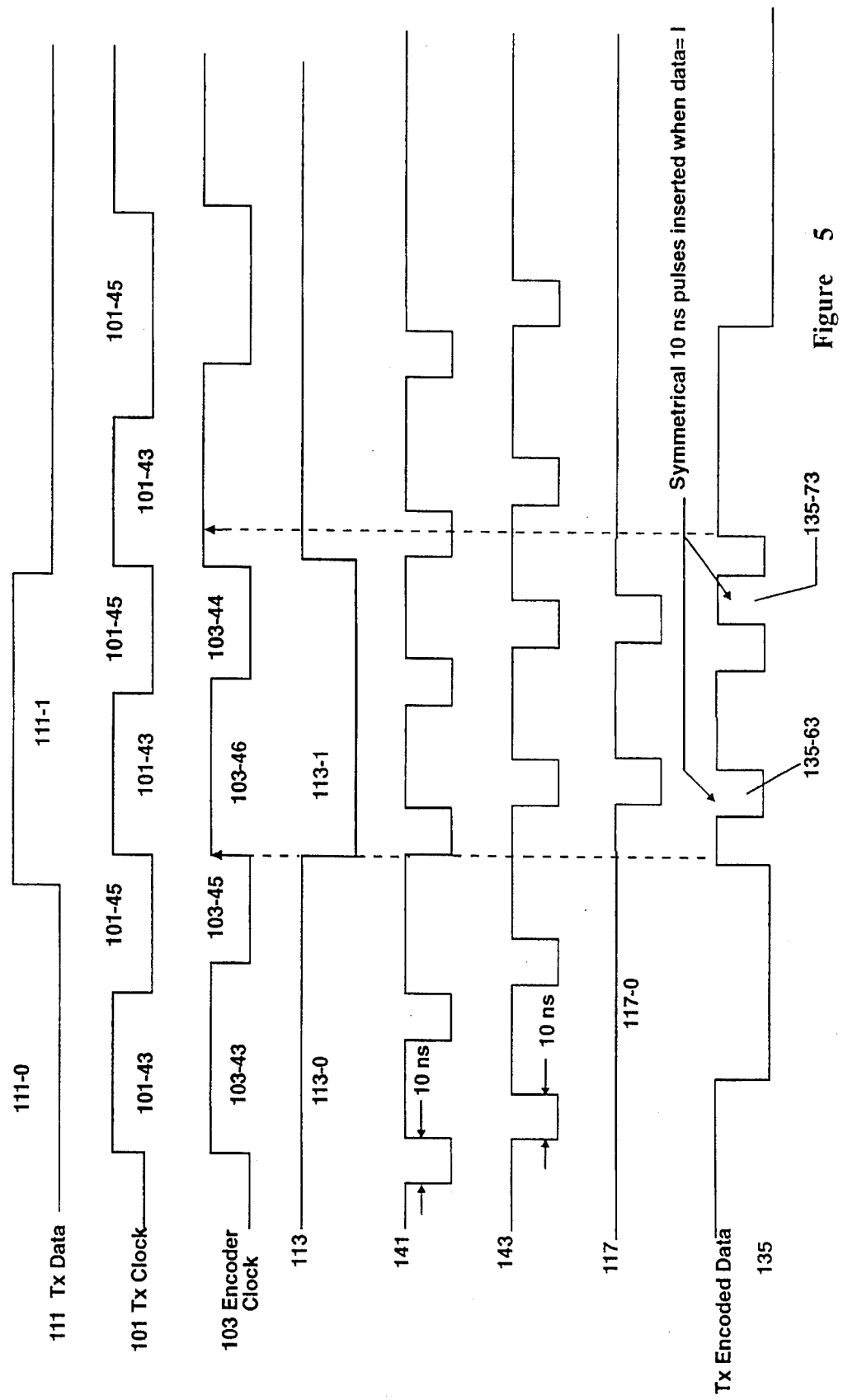
FIG. 5 is a timing diagram associated with the operation of FIG. 4.
Figure 12:
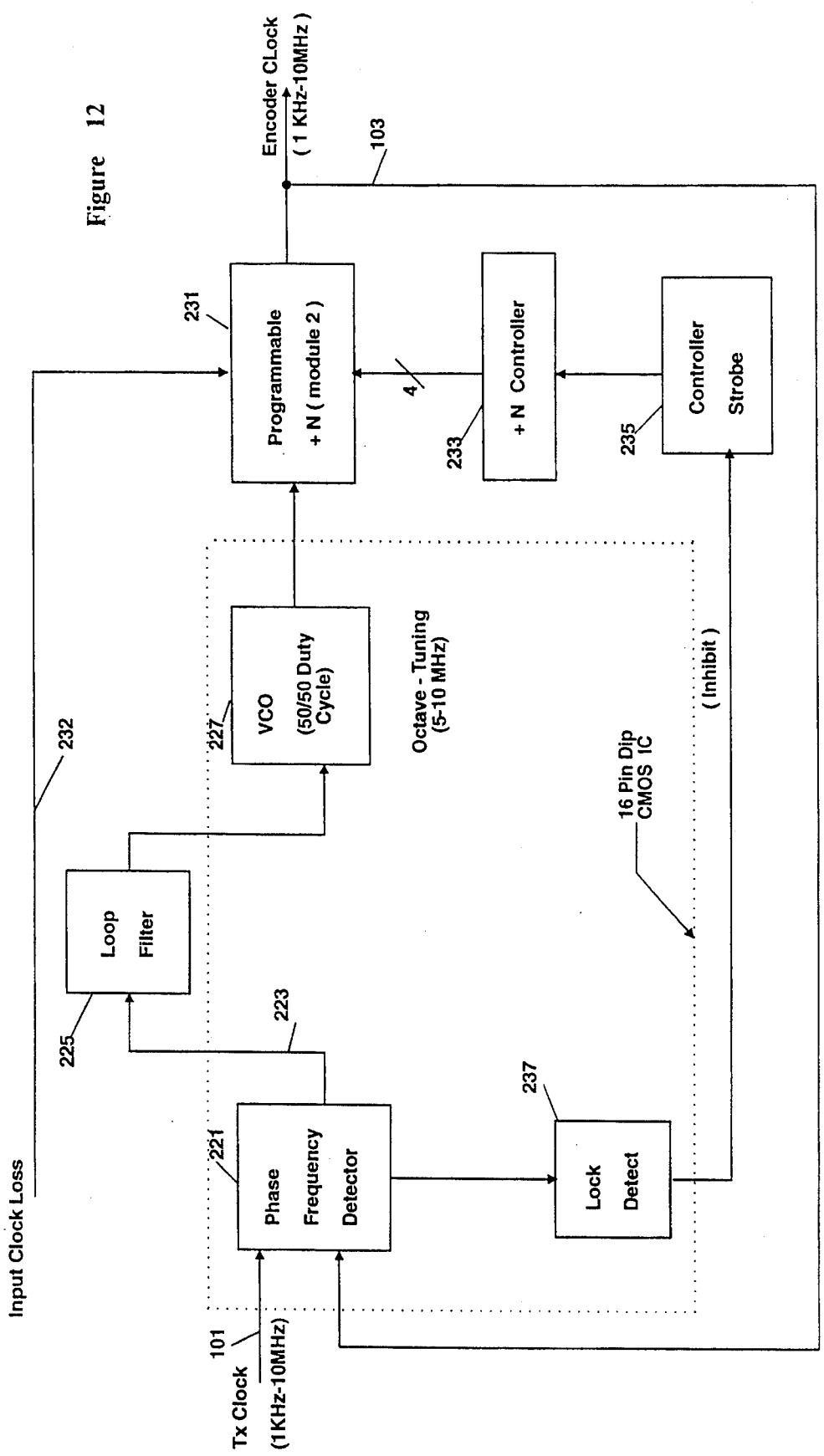
FIG. 12 is a block diagram of the configuration of a clock asymmetry corrector.

FIG. 4 is a block diagram of an embodiment of a transmit encoder in accordance with the present invention, while FIG. 5 is a timing diagram associated with the operation of FIG. 4. In order to accommodate asymmetry in the clock signal to be encoded with the digital data to be transmitted, which may be not be insubstantial (e.g. 60/40 or 40/60), the input clock supplied on transmit clock input link 101 is initially coupled to a clock asymmetry corrector 102. Clock asymmetry corrector 102 is operative to adjust the input clock, so that what results is an encoder clock having less than ±5% asymmetry. This 'corrected' encoder clock is supplied over an encoder clock link 103. Details of the clock asymmetry corrector 102 are shown in FIG. 12, to be described.

In the circuit diagram of FIG. 4, clock asymmetry corrector 102 is coupled to receive an input clock loss control signal on line 104. The input clock loss control signal on line 104 is further coupled to a hard reset input of a flip-flip 106. Flip-flop 106 has its data or D input coupled to receive input data on line 111, and its clock input Ck coupled to encoder clock line 103. The QBAR output port is coupled over link 113 to a first input 115 of an OR gate 117. OR gate has an output 121 coupled over link 123 to a first input 131 of an exclusive NOR gate 133. The output 135 of exclusive NOR gate 133 corresponds to the encoded clock signal to be routed to an optical transmitter unit shown in FIG. 6, for electro-optic conversion and fiber coupling to a digital communication link. Encoder clock line 103 is further coupled to a bipolar transition detector 141, the output of which is coupled through a relatively short duration (e.g. 10 ns) delay circuit 143 to a second input 116 of OR gate 117. Bipolar transition detector 141 is operative to generate a reduced width (e.g. 10 nsec) pulse in response to every transition of the encoder clock signal on link 103.

Referring now to the timing diagram of FIG. 4, in operation, the binary value of the data input signal on line 111 is initially a zero, as shown at 111-0, so that the QBAR output of flip-flop 106 and, consequently, the output of OR gate 117 are high, as shown at 113-0 and 117-0, respectively. Thus, the encoder clock on line 103 passes through the exclusive NOR gate 133, as is, and is applied to output 135 unchanged, thereby effectively implementing the coding rule for a data state=0.

For the present example, bipolar transition detector 141 generates a 10 nsec pulse in response to every encoder clock transition, as shown by signal trace 141. These transition pulses are delayed (10 nsec) by delay circuit 143 and applied to the second input 116 of OR gate 117. When the transmit data line changes state and goes from low to high, as shown at 111-1, the QBAR output of flip-flop 106 on line 113 signal goes low at the next encoder clock transition, as shown at 113-1, which enables the delayed 10 nsec pulse from delay circuit 143 to pass through OR gate 117 to exclusive NOR gate 133. When the delayed pulse output of OR gate 117 is applied to exclusive NOR gate 133, its output state reverses for 10 nsec, as shown at 135-63 and 135-73, thereby effectively inserting a 10 nsec pulse after each of the clock transitions 103-46 and 103-44 of the encoder clock on encoder clock line 103, and implementing the above-described coding rule for data=1.

Should there be a loss of input clock signal 101, an input clock 'loss of signal' line 104 from the front end of the transmitter changes state, forcing clock asymmetry corrector 102 to generate a predetermined substitute clock frequency. The change of state of line 104 also forces the data state to zero, by holding flip-flop 106 in a hard reset state. As a result, during loss of encoder clock, with the QBAR output of flip-flop 106 on link 113 being held high, (so that the above described 10 ns pulses 63 and 73 cannot be inserted into successive event cells of a clock cycle), the substitute clock frequency supplied over encoder clock link 103 is output 'as is', so that a constant zero encoded data state is provided at the output 135 of exclusive NOR gate 133 and transmitted to the far end of the communication link, thereby preventing the receive end data output line from chattering.

FIBER OPTIC TRANSMITTER UNIT (FIG. 6)

Figure 6:
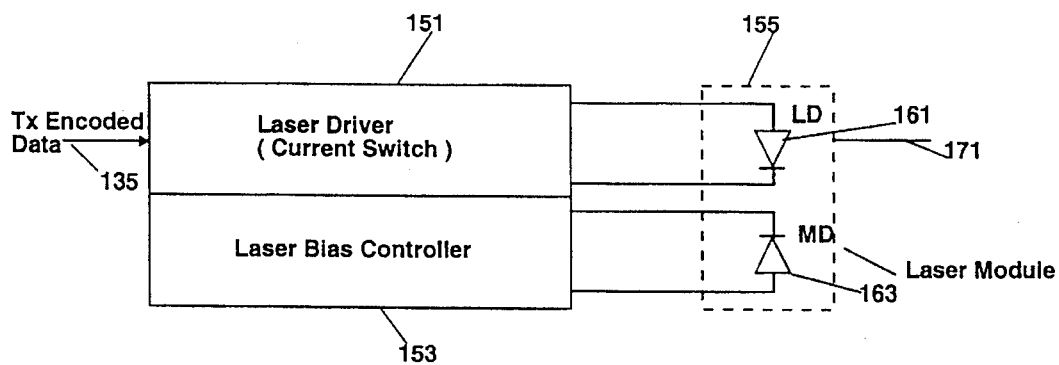
FIG. 6 diagrammatically illustrates a laser-based optical transmitter device.

FIG. 6 diagrammatically illustrates a laser-based optical transmitter device to which the output port 135 of exclusive NOR gate 133 of the encoder of FIG. 4 is coupled. The transmitter comprises an emitter-coupled current switch 151, a laser bias controller 153, and a laser diode module 155. The transmit encoded data on line 135 drives current switch 151 which, in turn, drives an output laser diode 161.

To accommodate the range of operation of the present example, emitter-coupled current switch 151 may operate at nanosecond rise/fall times and provide 100 mA peak drive current capability.

Laser diode 161 is coupled to launch its digitally modulated output into a single mode optical fiber 171. A portion of the light emitted from laser diode 161 is optically fed back to a level monitoring detector 163 in order to control the operation of laser bias controller so as maintain the light output level of laser diode 161 within prescribed power limits.

FIBER OPTIC RECEIVER UNIT (FIG. 7)

Figure 7:
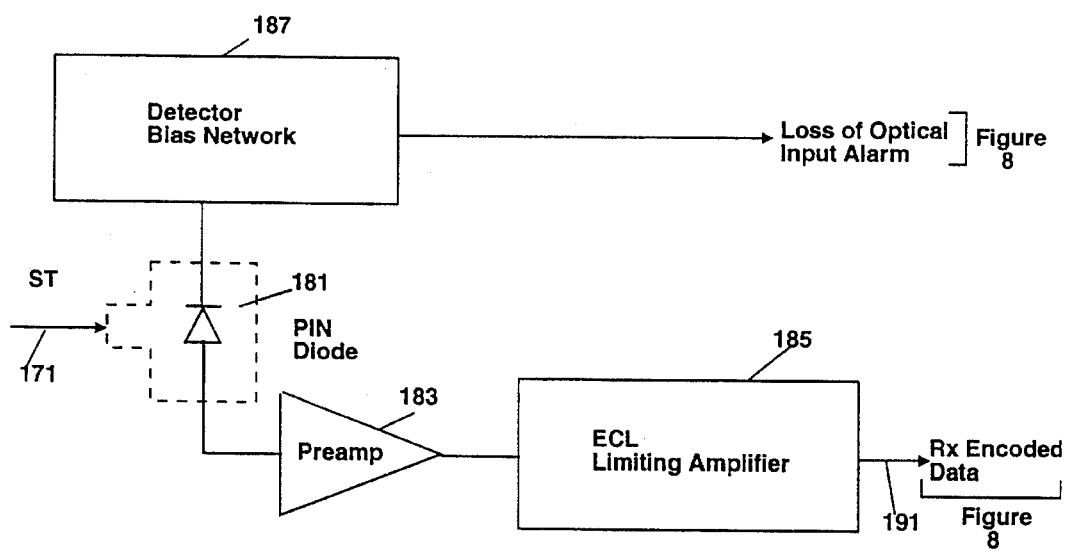
FIG. 7 diagrammatically illustrates the components of an optical receiver.

FIG. 7 diagrammatically illustrates the components of an optical receiver, which is coupled to convert incident light that has been transmitted over optical fiber 171 into electrical output signals for clock and data recovery by downstream decoding circuitry to be described. The optical receiver comprises a PIN photodiode 181 which is mounted in an optical fiber coupling element (not shown) to which fiber 171 is coupled. Photodiode 181 may comprise an InGaAs PIN photodiode, capable of sub-nanosecond rise/fall times at 5 V bias. A detector bias network 187 is provided for controlling the optical sensitivity level of PIN diode 181. PIN diode 181 is operated in photoconductive mode and its output current signal, which varies with the intensity of the received optical beam transmitted through the fiber, is coupled directly to a transimpedance preamplifier 183.

Transimpedance preamplifier 183 may comprise a commercially available integrated circuit, such as one capable of 150 MHz bandwidth and more than 10 K of transimpedance. Transimpedance preamplifier 183 has complementary transimpedance outputs coupled directly to balanced inputs of an ECL (emitter-coupled logic) limiting amplifier 185. ECL limiting amplifier 185 may comprise a single, commercially available integrated circuit, with sufficient dynamic range to handle a −32 to −10 dBm (minimum) optical input dynamic range, while delivering a fully-limited logic-level output. Maximum sensitivity and minimum pulse distortion may be provided by means of automatic limiting amplifier offset nulling, based on output duty cycle monitoring and error integration, which may employ the 50/50 transmit symmetry enabled by the clock asymmetry corrector in the encoder, described above. The output of amplifier 185 is coupled over line 191 as received encoded data, from which both clock and data bits are to be extracted, as will be described.

RECEIVE CLOCK AND DATA RECOVERY CIRCUIT (FIGS. 8 AND 9)

FIG. 8 is a block diagram of a receive decoder block diagram, while FIG. 9 is a timing diagram associated with the operation of FIG. 8. The received encoded data from the optical receiver of FIG. 7 is routed via line 191 to a digital track and hold circuit 201 and to the D input of a data recovery flip-Flop 203. Digital track and hold circuit 201 is operative to recover the clock signal, in combination with a very fast bipolar transition detector 205 and a non-retriggerable monostable circuit 207. Monostable circuit 207 is operative to produce a 30 nsec "hold" pulse. The 30 ns width of the "hold" pulse ensures that the pulse straddles the insertion pulses 191-63 and 191-73 in the Rx Encoded Data bit stream input over line 191, so that the insertion pulses 191-63 and 191-73 are effectively blanked and therefore do not appear in the signal at the output 202 of digital track and hold circuit 201, which output is the non-delayed version of the recovered clock.

The output of digital track and hold circuit 201 is coupled to a 15 ns delay circuit 208, the output of which provides the recovered clock signal on line 209 for application to the clock input of flip-flop 203. Delay circuit 208 is operative to controllably generate a pulse having an edge that occurs midway through the location of any inserted ten nanosecond (data=1) pulse in the encoded clock, so that any such inserted pulses may be identified. Since each such inserted pulse is delayed from the beginning of a respective event cell by 10 ns and the duration of such a pulse is 10 ns, the width of an output pulse generated by delay circuit 208 is 15 ns. The Q output of flip-flop 203 provides recovered data for the user on output link 211.

Referring to the operational timing diagram of FIG. 9, let it be assumed that the received encoded data waveform on input line 191 is as illustrated at Rx Encoded Data at the top of the timing diagram. The output 202 of digital track and hold (DTH) circuit 201 simply "tracks" this input signal, so long as the "hold" command output of monostable circuit 207 is not asserted. In the illustrated example, during a first time period or clock cycle T0, the received encoded clock is representative of a binary data value of zero, (no dual pulse insertion). Immediately following time period T0 is time period T1. During this time period, the encoded clock signal contains a binary data value of one. As will be described, if the "hold" command is asserted just prior to the occurrence of inserted data=1 pulses, and held until just after the pulses disappear, these inserted pulses (shown as shaded pulses 191-63 and 191-73) will be effectively stripped off, and the output signal on line 202 will be an exact reproduction of the original clock signal, shown in FIG. 5.

The "hold" command input to digital track and hold circuit 201 is generated by the operation of bipolar transition detector 205 and non-retriggerable monostable circuit 207. Bipolar transition detector 205 outputs a trigger pulse $TP_{206}$ on line 206 every time the signal on line 202 transitions either high or low. These trigger pulses $TP_{206}$, in turn, trigger non-retriggerable monostable circuit 207, which outputs a 30 nsec "hold" pulse $HP_{210}$ on line 210. This "hold" pulse $HP_{210}$ freezes the current state of digital track and hold circuit 201. As pointed out above, the 30 nsec width of "hold" pulse causes the "hold" pulse $HP_{210}$ to straddle the insertion pulses 191-63 and 191-73 in the Rx Encoded Data bit stream input over line 191, so that the insertion pulses 191-63 and 191-73 are effectively blanked and therefore do not appear in the signal at the output 202 of digital track and hold circuit 201.

The output of 15 nsec delay circuit 208 on line 209 is the recovered clock. It will be noted that the positive edge $PE_{209}$ of the recovered clock signal on line 209 occurs exactly in the middle of the first data=1 insertion pulse 191-63 in the Rx Encoded Data stream on line 191, as denoted by dotted line 220. Flip-flop 203 is used to sample the Rx Encoded Data on line 191, at this time, whereby the presence or absence of the insertion pulse 191-63 may be detected, thereby providing an indication of the state of the data bit. It should also be noted that it is necessary to only sample one of the two insertion pulses (here the first insertion pulse 191-63) for each data=1 bit. The redundant or second insertion pulse 191-73 keeps the encoded data exactly dc-balanced. In addition, as noted earlier, the redundant pulse 191-73 creates the possibility for sub-rate channel signalling and in-service error detection.

Should there be a loss of input optical signal, an input optical loss status alarm signal from the opto-electronic front end of the receiver will be applied to the hard reset input of flip-flop 203, and will force the output data line 211 to a steady-state zero, to avoid the output of "trash" data on line 211. The recovered clock and data output signals on lines 209 and 211, respectively are preferably buffered and complemented by digital communication (e.g. RS422) line drivers (not shown).

ERROR DETECTION (FIGS. 10 AND 11)

In-service error detection is easily accomplished by sampling the presence of the second insertion pulse 191-73 and comparing the detected data value with the first pulse sample 191-63. If the two data values are different, an error is inferred. For this purpose, an error detection circuit illustrated in FIG. 10 may be employed. Specifically, the Rx Encoded Data line 191 is coupled to the data or D inputs of each of flip-flops 212 and 214. The flip-flops are complementarily clocked by the recovered clock signal on line 209, which is applied directly to the clock or C input of flip-flop 212 and through inverter 216 to the clock input of flip-flop 214. The QBAR outputs of flip-flops 212 and 214 are applied as respective inputs to an exclusive OR circuit 218, the output of which is coupled to the data or D input of an 'error' flip-flop 222. The QBAR output of flip-flop 212 on line 224 is representative of normal recovered data. Flip-flop 222 is clocked by the recovered clock signal on line 209. The QBAR output of flip-flop 222 is indicative of the presence of errors.

Figure 10:
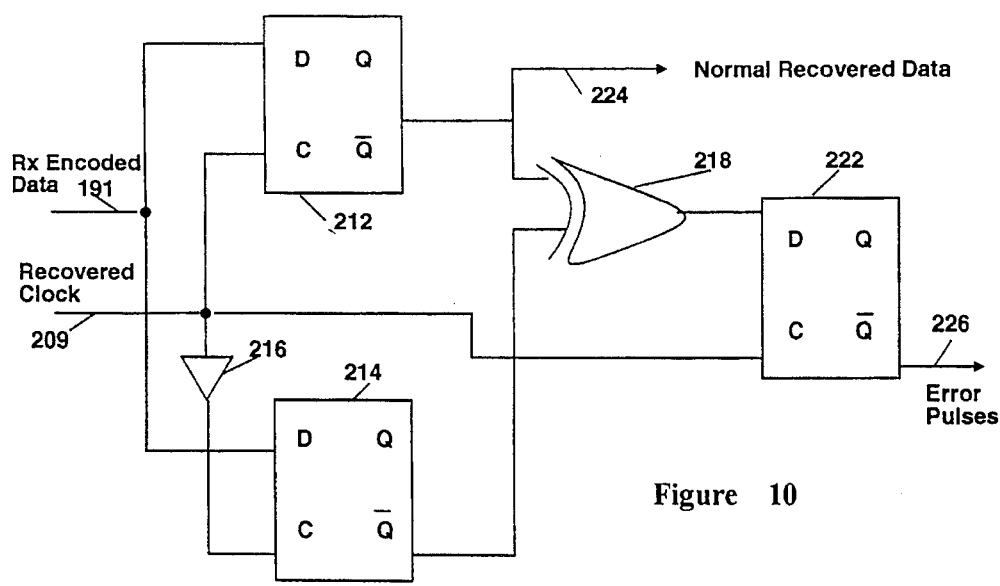
FIG. 10 is a logic circuit diagram of an error detection circuit for detecting errors in the output of the receive decoder of FIG. 8.
Figure 11:
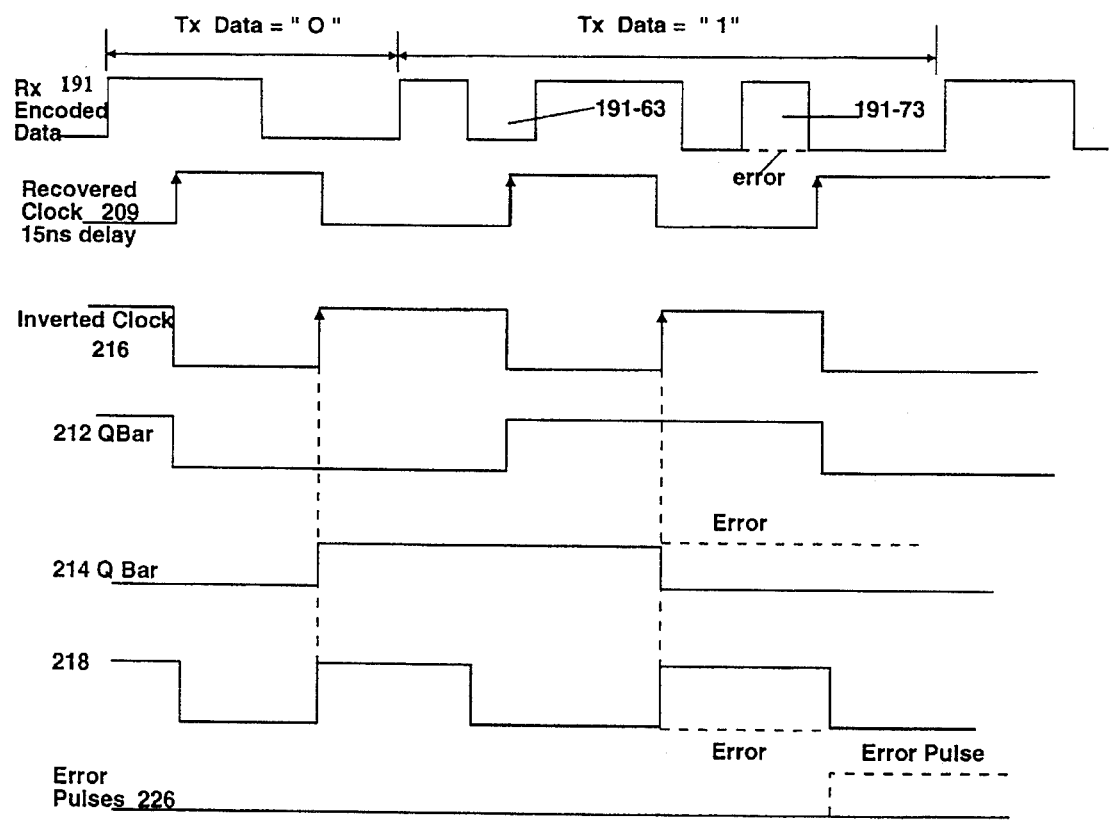
FIG. 11 is a timing diagram associated with the operation of the error detection logic circuit of FIG. 10.

FIG. 11 is a timing diagram associated with the operation of the error detection logic circuit of FIG. 10. Since redundant information is being transmitted by way of the second inserted pulse 191-73, errors occurring in transmission (or in hardware) are detected by decoding the second pulse and comparing the result with the first pulse decoding. For this purpose the QBAR outputs of flip-flops 212 and 214 are applied to exclusive OR gate 218. If the results disagree, one must be wrong and an error has occurred. As shown in FIG. 11, the true recovered clock on line 209 clocks flip-flop 212 for the presence of the first pulse 191-63, and flip-flop 214 for the presence of the complementary, second pulse 191-73. Regardless of the pulse presence or absence, the decisions should be the same. Exclusive OR gate 218 compares QBAR outputs of the flip-flops 212 and 214, and the comparison is sampled at the next positive true clock transition applied to flip-flop 222. If there is a disagreement between the two (i.e. the output of exclusive OR gate 218 is low), an error pulse lasting one clock cycle is produced on output line 226. Otherwise, the QBAR output of flip-flop 222 remains low.

SUB-RATE CHANNEL SIGNALLING

The error detection circuit of FIG. 10 can be also used as the basis for sub-rate channel signalling, for example, for the purpose of performing far-end loopback switching. Such sub-rate channel signalling involves the transmission of an intentional error pattern (e.g. PN sequence) that has an infinitesimal probability of occurring in a link operating otherwise error-free. Sub-rate channel signalling may be effected by intentionally interrupting the transmission of the second insertion pulse in some predetermined, systematic manner, similar to the transmission of legal bipolar violations used for sub-rate channel signalling in alternate-mark-inversion bipolar signalling formats over conventional copper wire pairs. This systematic "error pattern" is then sensed at the output of the receiver decoder and a prescribed action, such as "execute switched loopback", performed in response to detection of the given error pattern.

Namely, the received decoder error pulses are examined for the presence of an embedded sub-rate message (e.g. loopback request) within the error sequence. To perform a loopback, the local transmit input unit is switched to the local receive output. The receiver decoder must be left connected to sense when the loopback request is canceled. When performing sub-rate channel signalling, it is necessary to avoid transmitting the intentional error sequence so fast that the dc balance of the Tx Data is significantly disturbed.

CLOCK ASYMMETRY CORRECTOR (FIG. 12)

As pointed out above in connection with the description of FIG. 3, the transmit encoder employs a clock asymmetry corrector 102, the details of which are shown in FIG. 12, which is operative to adjust the input clock, so that an encoder clock having less than ±5% asymmetry is supplied over an encoder clock link 103. The clock asymmetry corrector ensures maximum far-end receiver sensitivity (there is no baseline wander due to asymmetry in the incoming serial data stream) and also provides a very high quality clock to be delivered over receiver output line 209.

As shown in FIG. 12, the input to the clock assmmetry corrector is the original transmit clock supplied over transmit clock line 101. Transmit clock input line is coupled to a phase-frequency detector (PFD) 221. The phase-frequency detector has an output coupled over link 223 to a loop filter 225, which may be comprised of a simple passive lead-lag network comprised of two resistors and one capacitor. The output of loop filter 225 is coupled to a voltage-controlled oscillator (VCO) 227. The output of VCO 227 is a clock signal having a 50/50 output duty cycle (within 1%), which enables its use directly as the regenerated clock in the 5–10 MHz range. VCO 227 tunes in excess of an octave, from below 5 to above 10 MHz and provides its output to a programmable divide-by-N (modulo two) divider 231. The programmable divide-by-N divider may comprise a multi-stage binary Johnson counter, which provides a plurality of simultaneously available 50/50 duty cycle modulo-2 clock frequencies, divided down from VCO 227. The selected output clock ("Encoder Clock") on line 103 is determined by a divide-by-N controller 233. The value of N is programmable (e.g. from 1 to 8192 (modulo 2) in the case of a thirteen bit device), which makes it possible to select an encoder clock frequency from above 10 MHz to below 1 KHz.

Divide-by-N controller 233 generates commands which determine the selected frequency and may comprise a four-stage counter which sequences in response to a strobe pulse from a controller strobe pulse generator. At full-scale, divide-by-N controller 233 rolls over to a preset (Hex 2) and sequences up again at every strobe output from controller 235. In the present example, the strobe frequency is in the 10–100 Hz range when not inhibited by the output of a lock detector 237, which monitors the output of phase-frequency detector 221.

The overall operation of the clock assmmetry corrector circuit of FIG. 12 is as follows. A transmit clock of almost any degree of asymmetry (provided the minimum input pulse width is no less than about 30 nsec (30/70 asymmetry at 10 MHz) at any frequency from 10 MHz to 1 KHz) is applied over line 101 to phase-frequency detector 221. Initially, the loop is assumed to be out of lock, so that no inhibit signal is asserted by lock detector 237. Thus, the controller strobe output signal is not inhibited. Given an arbitrary beginning state for the divide-by-N controller 233, an arbitrary divided-down clock frequency is selected. Further, assuming that this frequency is not within the loop pull-in range, a lock detect state change will not occur prior to the occurrence of the next pulse output by controller strobe circuit 225.

At the next strobe, the next lower encoder clock frequency tap will be selected by the programmable divide-by-N divider 231, and again lock will be attempted. If the newly selected clock is within pull-in range, a lock detect will occur prior to the occurrence of the next controller strobe; thereafter the strobe pulses will be inhibited. If the loop is not in range, this sequencing process will continue until the correct frequency is located and locked, whereupon the controller strobe 235 will be inhibited by lock detector 237, as long as the input transmit clock signal on line 101 is not interrupted, or the frequency is not changed. For the present example, the worst-case time-to-lock (from the time a new transmit clock frequency is applied until lock is achieved) is typically less than one second.

Should the input clock signal be removed, an input clock loss status alarm signal will be asserted on line 232. This 'loss of clock' signal will force the clock asymmetry corrector to output a predetermined clock frequency on line 103, so that an acceptable quality clock is still available for transmitting a steady-state (data=0) signal (i.e. an unmodified clock signal) to the far end receiver.

As will be appreciated from the foregoing description, the previously described drawbacks of conventional digital clock encoding schemes, including that proposed by Chi and others, are effectively obviated in accordance with the digital clock encoding technique of the present invention, which is totally D.C. balanced and also bit-rate independent, so that it is not bandwidth limited, but is applicable to a variety of digital signalling systems, including, but not limited to, fiber optic digital signalling. Moreover, because the encoding mechanism of the present invention has built-in redundancy, it readily accommodates both quality monitoring at the receiver, as well as sub-rate channel signalling.

Pursuant to the present invention, rather than associate a respective event cell with a complete clock cycle, whereby an event cell is demarcated by clock transitions of the same polarity, as in the above-referenced Chi encoding mechanism, each event cell is demarcated by clock transitions of opposite polarity, whereby a respective event cell is defined as the epoch bounded by alternating, opposite clock transitions of the clock signal. Namely, according to the invention within each clock cycle there are two event cells, rather than one, as in the prior art. This additional, or redundant, event cell provides the invention with a significant performance capability not heretofore obtained.

The binary encoding scheme through which the clock signal is selectively modified in accordance with the redundant event cell generation technique of the invention is such that, for a first binary data value, such as a '0', a pair of unmodified successive event cells of the clock signal are provided as an output. Namely, the clock signal is unaffected, so that both halves of a complete, unmodified clock cycle are reproduced 'as is' as the encoded clock output. On the other hand, for a second binary data value, such as a '1' a pair of modified versions of successive event cells of the clock signal are provided as the encoded clock output.

For the second binary value, the modification of an event cell involves inserting a pulse, comprised of a pair of successive opposite polarity transitions between the respective pair of alternating, opposite clock transitions that demarcate the end boundaries of the event cell. This is preferably accomplished by inserting a pulse of a finite duration, less than the duration of the event cell, the pulse being delayed with respect to a leading clock transition of the pair of alternating, opposite clock transitions of the event cell. Since event cells are encoded in pairs, in order to provide redundancy and achieve total D.C. balance, the first pulse has a first polarity, while the second pulse has a second, complementary polarity.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of encoding digital data comprising the steps of:
   (a) generating a clock signal having a sequence of alternating, opposite clock transitions, between each pair of successive opposite ones of which clock transitions a respective event cell is defined;
   (b) for a first binary data value, providing, as an output, a pair of unmodified successive event cells of said clock signal; and
   (c) for a second binary data value, generating a modified event cell having contents thereof between said opposite clock transitions of said clock signal different from an unmodified event cell, and providing, as an output, a pair of immediately successive modified event cells of said clock signal.

2. A method of encoding digital data comprising the steps of:
   (a) generating a clock signal having a sequence of alternating, opposite clock transitions, between each pair of successive opposite ones of which clock transitions a respective event cell is defined;
   (b) for a first binary data value, providing, as an output, a pair of unmodified successive event cells of said clock signal; and
   (c) for a second binary data value, providing, as an output, a pair of modified versions of successive event cells of said clock signal, wherein a modified version of a respective event cell of said clock signal comprises an event cell having a pair of successive opposite polarity transitions occurring between a respective pair of alternating, opposite clock transitions of said event cell.

3. A method of encoding digital data comprising the steps of:
   (a) generating a clock signal having a sequence of alternating, opposite clock transitions, between each pair of successive opposite ones of which clock transitions a respective event cell is defined;
   (b) for a first binary data value, providing, as an output, a pair of unmodified successive event cells of said clock signal; and
   (c) for a second binary data value, providing, as an output, a pair of modified versions of successive event cells of said clock signal, wherein a modified version of a respective event cell of said clock signal comprises an event cell having a pulse of a finite duration, less than the duration of said respective event cell, said pulse being delayed with respect to a leading clock transition of the pair of alternating, opposite clock transitions of said event cell.

4. A method of encoding digital data comprising the steps of:
   (a) generating a clock signal having a sequence of alternating, opposite clock transitions, between each pair of successive opposite ones of which clock transitions a respective event cell is defined;
   (b) for a first binary data value, providing, as an output, a pair of unmodified successive event cells of said clock signal; and
   (c) for a second binary data value, providing, as an output, a pair of modified versions of successive event cells of said clock signal, wherein a first of said pair of modified versions of successive event cells comprises a first event cell having a first pulse of a first polarity and a first duration, less than the duration of said first event cell, said first pulse being delayed with respect to a leading clock transition of the pair of alternating, opposite clock transitions of said first event cell, and wherein a second of said pair of modified versions of successive event cells comprises a second event cell having a second pulse of a second polarity and said first duration, said second pulse being delayed with respect to a leading clock transition of the pair of alternating, opposite clock transitions of said second event cell.

5. A digital data communication method comprising the steps of:
   (a) providing a clock signal having a sequence of alternating, opposite clock transitions, between each pair of successive opposite ones of which clock transitions a respective event cell is defined;
   (b) encoding said clock signal with binary data by, for a first binary data value, providing a pair of unmodified successive event cells of said clock signal and, for a second binary data value, generating a modified event cell having contents thereof between opposite clock transitions of said clock signal different from an unmodified event cell, and providing a pair of immediately successive modified event cells of said clock signal, thereby providing redundant data information in a respective clock cycle; and
   (c) transmitting the resultant encoded clock signal over a digital communication link.

6. A digital data communication method comprising the steps of:
   (a) providing a clock signal having a sequence of alternating, opposite clock transitions, between each pair of successive opposite ones of which clock transitions a respective event cell is defined;
   (b) encoding said clock signal with binary data by, for a first binary data value, generating a modified event cell having contents thereof between opposite clock transitions of said clock signal different from an unmodified event cell, and providing a pair of unmodified successive event cells of said clock signal and, for a second binary data value, providing a pair of immediately successive modified event cells of said clock signal, thereby providing redundant data information in a respective clock cycle;
   (c) transmitting the resultant encoded clock signal over a digital communication link;
   (d) receiving the encoded clock signal transmitted in step (c); and (e) processing the encoded clock signal received in step (d) to recover said clock signal and occurrences of first and second binary data values.

7. A digital data communication method comprising the steps of:
  (a) providing a clock signal having a sequence of alternating, opposite clock transitions, between each pair of successive opposite ones of which clock transitions a respective event cell is defined;
  (b) encoding said clock signal with binary data by, for a first binary data value, generating a modified event cell having contents thereof between opposite clock transitions of said clock signal different from an unmodified event cell, and providing a pair of unmodified successive event cells of said clock signal and, for a second binary data value, providing a pair of immediately successive modified event cells of said clock signal, thereby providing redundant data information in a respective clock cycle; and
  (c) transmitting the resultant encoded clock signal over a digital communication link, and wherein
    step (b), for a second binary data value, comprises encoding a respective event cell of said clock signal to produce an event cell having a pair of successive opposite polarity transitions occurring between a respective pair of alternating, opposite clock transitions of said respective event cell.

8. A digital data communication method comprising the steps of:
  (a) providing a clock signal having a sequence of alternating, opposite clock transitions, between each pair of successive opposite ones of which clock transitions a respective event cell is defined;
  (b) encoding said clock signal with binary data by, for a first binary data value, generating a modified event cell having contents thereof between opposite clock transitions of said clock signal different from an unmodified event cell, and providing a pair of unmodified successive event cells of said clock signal and, for a second binary data value, providing a pair of immediately successive modified event cells of said clock signal, thereby providing redundant data information in a respective clock cycle; and
  (c) transmitting the resultant encoded clock signal over a digital communication link, and wherein
    step (b), for a second binary data value, comprises encoding a respective event cell of said clock signal to produce an event cell having a pulse of a finite duration, less than the duration of said respective event cell, said pulse being delayed with respect to a leading clock transition of the pair of alternating, opposite clock transitions of said respective event cell.

9. A digital data communication method according to claim 6, wherein, in step (b), a first of said pair of modified versions of successive event cells comprises a first event cell having a first pulse of a first polarity and a first duration, less than the duration of said first event cell, said first pulse being delayed with respect to a leading clock transition of the pair of alternating, opposite clock transitions of said first event cell, and wherein a second of said pair of modified versions of successive event cells comprises a second event cell having a second pulse of a second polarity and said first duration, said second pulse being delayed with respect to a leading clock transition of the pair of alternating, opposite clock transitions of said second event cell.

10. A digital data communication method according to claim 6, wherein step (e) comprises sampling the encoded clock signal received in step (d) to detect the presence of at least one of said first and second pulses, and producing data of said first binary value in the absence of either of said at least one of said first and second pulses, and producing data of said second binary value in response to detecting either of said first and second pulses.

11. A digital data communication method comprising the steps of:
  (a) providing a clock signal having a sequence of alternating, opposite clock transitions, between each pair of successive opposite ones of which clock transitions a respective event cell is defined;
  (b) encoding said clock signal with binary data by, for a first binary data value, generating a modified event cell having contents thereof between opposite clock transitions of said clock signal different from an unmodified event cell, and providing a pair of unmodified successive event cells of said clock signal and, for a second binary data value, providing a pair of immediately successive modified event cells of said clock signal, thereby providing redundant data information in a respective clock cycle; and
  (c) transmitting the resultant encoded clock signal over a digital communication link, and wherein
    step (a) comprises generating a clock signal having successive event cells which are not necessarily complementary symmetric, and correcting asymmetry in a respective cycle of said clock signal to provide a corrected clock signal, a respective cycle of which contains a pair of successive substantially complementary symmetric event cells, and wherein step (b) comprises encoding said corrected clock signal with said binary data.

12. A digital data communication method according to claim 6, wherein step (e) comprises processing the encoded clock signal received in step (d) to recover redundant occurrences of said second binary data values in a respective clock cycle.

13. A digital data communication method according to claim 12, further comprising the step (f) of comparing the contents of successive event cells within a clock cycle of said received clock signal to detect the presence of a binary data value error.

14. A digital data communication method according to claim 13, wherein step (f) comprises examining the contents of each of a pair of successive event cells of a clock cycle associated with said second binary value, so as to determine whether each of said pair of successive event cells of said clock cycle has been modified in accordance with said second binary data value, and thereby provide a measure of errors in the received encoded clock signal.

15. A digital data communication method according to claim 6, wherein step (b) further comprises controllably altering the binary data-encoding of said successive event cells of selected clock cycles of said clock signal, thereby controllably modifying redundant information contained in said selected clock cycles of said clock signal, in accordance with sub-rate channel signalling information, and where step (e) comprises examining the contents of each of a pair of successive event cells of a clock cycle of the received encoded clock signal to detect the presence of sub-rate channel signalling information.

16. A digital data communication system comprising:
  a clock signal source which is operative to generate a clock signal having a sequence of alternating, opposite clock transitions, between each pair of successive opposite ones of which clock transitions a respective event cell is defined;

an encoder which is operative to encode said clock signal with binary data such that, for a first binary data value, the encoded clock signal contains a pair of unmodified successive event cells of said clock signal and, for a second binary data value, the encoded clock signal contains a pair of immediately successive modified event cells of said clock signal, each modified event cell having contents thereof between opposite clock transitions of said clock signal different from an unmodified event cell, whereby the encoded clock signal carries redundant data information in a respective clock cycle; and a transmitter which is operative to transmit the encoded clock signal provided by said encoder over a digital communication link.

17. A digital data communication system comprising:

a clock signal source which is operative to generate a clock signal having a sequence of alternating, opposite clock transitions, between each pair of successive opposite ones of which clock transitions a respective event cell is defined;

an encoder which is operative to encode said clock signal with binary data such that, for a first binary data value, the encoded clock signal contains a pair of unmodified successive event cells of said clock signal and, for a second binary data value, the encoded clock signal contains a pair of immediately successive modified event cells of said clock signal, each modified event cell having contents thereof between opposite clock transitions of said clock signal different from an unmodified event cell, whereby the encoded clock signal carries redundant data information in a respective clock cycle;

a transmitter which is operative to transmit the encoded clock signal provided by said encoder over a digital communication link;

a receiver coupled to said digital communication link and operative to receive the encoded clock signal transmitted over said digital communication link; and a decoder which is operative to process the encoded clock signal received by said receiver so as to recover said clock signal and first and second binary data values.

18. A digital data communication system comprising:

a clock signal source which is operative to generate a clock signal having a sequence of alternating, opposite clock transitions, between each pair of successive opposite ones of which clock transitions a respective event cell is defined;

an encoder which is operative to encode said clock signal with binary data such that, for a first binary data value, the encoded clock signal contains a pair of unmodified successive event cells of said clock signal and, for a second binary data value, the encoded clock signal contains a pair of immediately successive modified event cells of said clock signal, each modified event cell having contents thereof between opposite clock transitions of said clock signal different from an unmodified event cell, whereby the encoded clock signal carries redundant data information in a respective clock cycle; and a transmitter which is operative to transmit the encoded clock signal provided by said encoder over a digital communication link, and wherein said encoder is operative, for a second binary data value, to encode a respective event cell of said clock signal into an event cell having a pair of successive opposite polarity transitions that occur between a respective pair of alternating, opposite clock transitions of said respective event cell.

19. A digital data communication system comprising:

a clock signal source which is operative to generate a clock signal having a sequence of alternating, opposite clock transitions, between each pair of successive opposite ones of which clock transitions a respective event cell is defined;

an encoder which is operative to encode said clock signal with binary data such that, for a first binary data value, the encoded clock signal contains a pair of unmodified successive event cells of said clock signal and, for a second binary data value, the encoded clock signal contains a pair of immediately successive modified event cells of said clock signal, each modified event cell having contents thereof between opposite clock transitions of said clock signal different from an unmodified event cell, whereby the encoded clock signal carries redundant data information in a respective clock cycle; and a transmitter which is operative to transmit the encoded clock signal provided by said encoder over a digital communication link, and wherein said encoder is operative, for a second binary data value, to encode a respective event cell of said clock signal into an event cell having a pulse of a finite duration, less than the duration of said respective event cell, said pulse being delayed with respect to a leading clock transition of the pair of alternating, opposite clock transitions of said respective event cell.

20. A digital data communication system according to claim 17, wherein said encoder is operative, for a first of said pair of modified versions of successive event cells, to produce a first event cell having a first pulse of a first polarity and a first duration, less than the duration of said first event cell, said first pulse being delayed with respect to a leading clock transition of the pair of alternating, opposite clock transitions of said first event cell and, for a second of said pair of modified versions of successive event cells, to produce a second event cell having a second pulse of a second polarity and said first duration, said second pulse being delayed with respect to a leading clock transition of the pair of alternating, opposite clock transitions of said second event cell.

21. A digital data communication system according to claim 17, wherein said decoder is operative to sample the received encoded clock signal to detect the presence of at least one of said first and second pulses, and to produce data of said first binary value in the absence of either of said at least one of said first and second pulses, and to produce data of said second binary value in response to the presence of either of said first and second pulses.

22. A digital data communication system comprising:

a clock signal source which is operative to generate a clock signal having a sequence of alternating, opposite clock transitions, between each pair of successive opposite ones of which clock transitions a respective event cell is defined;

an encoder which is operative to encode said clock signal with binary data such that, for a first binary data value, the encoded clock signal contains a pair of unmodified successive event cells of said clock signal and, for a second binary data value, the encoded clock signal contains a pair of immediately successive modified event cells of said clock signal, each modified event cell having contents thereof between opposite clock transitions of said clock signal different from an unmodified event cell, whereby the encoded clock signal carries redundant data information in a respective clock cycle; and a transmitter which is operative to transmit the encoded clock signal provided by said encoder over a digital communication link, and wherein said clock signal source includes a clock asymmetry corrector which is operative to receive a transmit clock signal having successive event cells which are not necessarily complementary symmetric, and to correct asymmetry in a respective cycle of said transmit clock signal to provide a corrected clock signal, a respective cycle of which contains a pair of successive substantially complementary symmetric event cells, and wherein said encoder is operative to encode said corrected clock signal with said binary data.

23. A digital data communication system according to claim 17, wherein said decoder is operative to process the received encoded clock signal to recover redundant second binary data values in a respective clock cycle.

24. A digital data communication system according to claim 23, further comprising an error detector which is operative to compare the contents of successive event cells within a clock cycle of the received encoded clock signal to detect the presence of binary data value errors.

25. A digital data communication system according to claim 24, wherein said error detector is operative to examine the contents of each of a pair of successive event cells of a received encoded clock cycle associated with said second binary value, so as to determine whether each of said pair of successive event cells of said received encoded clock cycle has been modified in accordance with said second binary data value, and thereby provide a measure of errors in the received encoded clock signal.

26. A digital data communication system according to claim 17, wherein said encoder is operative to controllably alter the binary data-encoding of said successive event cells of selected clock cycles of said clock signal, and thereby controllably modify redundant information contained in said selected clock cycles of said clock signal, in accordance with sub-rate channel signalling information, and wherein said decoder is operative to examine the contents of each of a pair of successive event cells of a clock cycle of the received encoded clock signal to detect the presence of sub-rate channel signalling information.

27. A digital data encoder comprising:

a clock signal generator which is operative to generate a clock signal having a sequence of alternating, opposite clock transitions, between each pair of successive opposite ones of which clock transitions a respective event cell is defined; and a clock signal encoder which is coupled to said clock signal generator and is operative, in response to a first binary data value, to encode said clock signal as a pair of modified successive event cells of said clock signal and, in response to a second binary data value, to encode said clock signal as a pair of immediately successive modified event cells of said clock signal, each modified event cell having contents thereof between opposite clock transitions of said clock signal different from an unmodified event cell.

28. A digital data encoder, comprising:

a clock signal generator which is operative to generate a clock signal having a sequence of alternating, opposite clock transitions, between each pair of successive opposite ones of which clock transitions a respective event cell is defined; and a clock signal encoder which is coupled to said clock signal generator and is operative, in response to a first binary data value, to encode said clock signal as a pair of unmodified successive event cells of said clock signal and, in response to a second binary data value, to encode said clock signal as a pair of modified versions of successive event cells of said clock signal, wherein a modified version of a respective event cell of said clock signal comprises an event cell having a pair of successive opposite polarity transitions occurring between a respective pair of alternating, opposite clock transitions of said event cell.

29. A digital data encoder comprising:

a clock signal generator which is operative to generate a clock signal having a sequence of alternating, opposite clock transitions, between each pair of successive opposite ones of which clock transitions a respective event cell is defined; and a clock signal encoder which is coupled to said clock signal generator and is operative, in response to a first binary data value, to encode said clock signal as a pair of unmodified successive event cells of said clock signal and, in response to a second binary data value, to encode said clock signal as a pair of modified versions of successive event cells of said clock signal, wherein a modified version of a respective event cell of said clock signal comprises an event cell having a pulse of a finite duration, less than the duration of said respective event cell, said pulse being delayed with respect to a leading clock transition of the pair of alternating, opposite clock transitions of said event cell.

30. A digital data encoder comprising:

a clock signal generator which is operative to generate a clock signal having a sequence of alternating, opposite clock transitions, between each pair of successive opposite ones of which clock transitions a respective event cell is defined; and a clock signal encoder which is coupled to said clock signal generator and is operative, in response to a first binary data value, to encode said clock signal as a pair of unmodified successive event cells of said clock signal and, in response to a second binary data value, to encode said clock signal as a pair of modified versions of successive event cells of said clock signal, wherein a first of said pair of modified versions of successive event cells comprises a first event cell having a first pulse of a first polarity and a duration, less than the duration of said first event cell, said first pulse being delayed with respect to a leading clock transition of the pair of alternating, opposite clock transitions of said first event cell, and wherein a second of said pair of modified versions of successive event cells comprises a second event cell having a second pulse of a second polarity and said duration, said second pulse being delayed with respect to a leading clock transition of the pair of alternating, opposite clock transitions of said second event cell.

31. A digital data encoder comprising:

a flip-flop circuit having a data input, to which digital data through which a clock signal to be encoded is applied, a clock input to which said clock signal is applied, said clock signal having a sequence of alternating, opposite clock transitions, between each pair of which clock transitions successive opposite ones of a respective event cell of said clock signal is defined, and an output;

a bipolar transition detector to which said clock signal is applied, said bipolar transition detector providing output pulses in response to occurrences of transitions of either polarity in said clock signal;

a delay circuit coupled to the output of said bipolar transition detector and being operative to generate a delayed pulse, said delayed pulse being delayed with respect to a respective transition of said clock signal; and a logic circuit coupled to logically combine the output of said flip-flop circuit, said delayed pulse and said clock signal, and providing an encoded clock signal, such that, for a first binary data value applied to data input, said encoded clock signal contains a pair of unmodified successive event cells of said clock signal and, for a second binary data value applied to said data input, the encoded clock signal contains a pair of modified versions of successive event cells of said clock signal, whereby the encoded clock signal carries redundant data information in a respective clock cycle.

32. A digital data encoder according to claim 31, wherein said logic circuit is operative, for a first of said pair of modified versions of successive event cells, to produce a first event cell having a first pulse of a first polarity and a first duration, less than the duration of said first event cell, said first pulse being delayed with respect to a leading clock transition of the pair of alternating, opposite clock transitions of said first event cell and, for a second of said pair of modified versions of successive event cells, to produce a second event cell having a second pulse of a second polarity and said first duration, said second pulse being delayed with respect to a leading clock transition of the pair of alternating, opposite clock transitions of said second event cell.

33. A digital data encoder according to claim 32, wherein said logic circuit comprises and OR circuit coupled to receive the output of said flip-flop circuit and said delayed pulse, and an exclusive NOR circuit coupled to receive the output of said OR circuit and said clock signal, and having an output providing said encoded clock signal.

34. A digital data encoder according to claim 31, further including a clock asymmetry corrector which is operative to receive a clock signal having a sequence of alternating, opposite clock transitions, between each pair of successive opposite ones of a respective event cell is defined, event cells of a respective clock cycle not being necessarily complementary symmetric, and to correct asymmetry in a respective cycle of said clock signal to provide a corrected clock signal, a respective cycle of which contains a pair of successive substantially complementary symmetric event cells, and wherein said corrected clock signal corresponds to said clock signal to be encoded.

35. A digital data decoder for decoding an encoded clock signal containing first and second binary data values, said encoded clock signal having a sequence of alternating, opposite clock transitions, between each pair of successive opposite ones of which clock transitions a respective event cell of said clock signal is defined, said encoded clock signal being encoded such that, for a first binary data value applied to data input, said encoded clock signal contains a pair of unmodified successive event cells of said clock signal and, for a second binary data value applied to said data input, the encoded clock signal contains a pair of modified versions of successive event cells of said clock signal, whereby the encoded clock signal carries redundant data information in a respective clock cycle, said digital data decoder comprising:

a digital track and hold circuit having a data input to which said encoded clock signal is applied, an output, and a hold input to which a hold signal for holding the logical state of said output is applied;

a data recovery flip-flop circuit having a data input, to which said encoded clock signal is applied, a clock input to which a recovered clock signal is applied, said recovered clock signal having a sequence of alternating, opposite clock transitions, between each pair of successive opposite ones of which clock transitions a respective event cell of said recovered clock signal is defined, and an output from which binary data is recovered;

a delay circuit coupled to the output of said digital track and hold circuit, and being operative to delay the output of said digital track and hold circuit with respect to a respective transition of the output of said digital track and hold circuit, said delayed output of said digital track and hold circuit corresponding to said recovered clock signal;

a bipolar transition detector coupled to the output of said digital track and hold circuit, said bipolar transition detector providing output pulses in response to occurrences of transitions of either polarity in the output of said digital track and hold circuit; and a non-retriggerable monostable circuit coupled to receive output pulses provided by said bipolar transition detector and being operative to generate a hold signal in response thereto, said hold signal being applied to the hold input of said digital track and hold circuit.

* * * * *